Feb. 4, 1969      A. C. REID      3,426,270

METHOD FOR DETERMINING MAGNETIC TAPE CORRELATION

Filed July 13, 1966

INVENTOR
ALBERT C. REID

BY *McLean, Morton & Boustead*
ATTORNEYS

000
United States Patent Office 3,426,270
Patented Feb. 4, 1969

3,426,270
METHOD FOR DETERMINING MAGNETIC TAPE CORRELATION
Albert C. Reid, Tulsa, Okla., assignor, by mesne assignments, to Sinclair Research, Inc., New York, N.Y., a corporation of Delaware
Filed July 13, 1966, Ser. No. 564,970
U.S. Cl. 324—46      5 Claims
Int. Cl. G01r 33/02

ABSTRACT OF THE DISCLOSURE

A method for and apparatus for determining correlation between the signal trains recorded on two magnetic tapes. The two tapes are arranged in closely spaced face-to-face relationship on opposite sides of a resistive ribbon of a material which exhibits a change in resistance when transgressed by magnetic flux. One of the tapes is moved relative to the other, and the change of resistance in the ribbon is measured as the recording is moved. The point of maximum correlation between the signal trains is the point at which the lowest resistance is measured.

---

This invention relates to a method for correlating and analyzing signals and, more particularly, to a method of determining the position of maximum correlation between the signals, e.g., seismic reflection signals recorded on two magnetic tapes.

In seismic exploration it is common practice to record the energy return from the earth on magnetic tape through the use of sound receivers, i.e., geophones which translate the return energy into an electrical signal. This is true whether the signal be a composite of many small man-made seismic disturbances or a single disturbance from the older shot-hole method of exploding dynamite. Such recording on magnetic tape permits a broad band recording, frequency wise, and permits the selection of any of several combinations of filters for use in replay of the tape and recording on paper so that the data may be compared visually and placed in its proper time-depth relation as regards other similar information in the locale. Such an operation is called visual correlation of seismic events. There are also additional correlation methods which involve photographic film and relative light measurement. Each of these known correlation methods is at best slow and rather expensive due to the number of operations involved and it is an object of this invention to provide an improved method of correlation, or matching of similar events recorded on two magnetic tapes.

It is well known that some metals such as bismuth and semiconductor materials exhibit a change in resistance when transgressed by magnetic flux. Indium-arsenide and indium-antimonide are two intermetallic combinations which will exhibit even grater change in resistance than bismuth when subjected to a magnetic field. Also, it is known that the magnetic tape which has recorded thereon the reflected energy from a seismic shot will exhibit a series of magnetic north and south poles along the recorded track. Utilizing these precepts, an improved method, and apparatus, for determining the position of maximum correlation of the signals recorded on two magnetic tapes, i.e., that position at which two adjacent tapes are most similar, has been provided in accordance with this invention. Since two magnetic tape recordings placed with their tracks face-to-face will have the magnetic north and south poles referred above arranged opposite each other in the position of maximum correlation, in accordance with this invention, a thin indium-antimonide ribbon, or other material which exhibts a change in resistance when transgressed by magnetic flux, is placed between the two magnetic tapes which are arranged with their tracks, i.e., recorded signals, face-to-face. At the position of maximum correlation, little if any flux will transgress this ribbon because of the similar signs on the north and south poles which are opposite each other and the resistance of the ribbon will be a minimum. However, when the tapes are moved relative to each other, the resistance will vary and maximum resistance results when one tape is moved either direction from the position of maximum correlation so that the point of lowest resistance is the position of maximum correlation.

This invention will be better understood from the accompanying drawing wherin:

Figure 1:
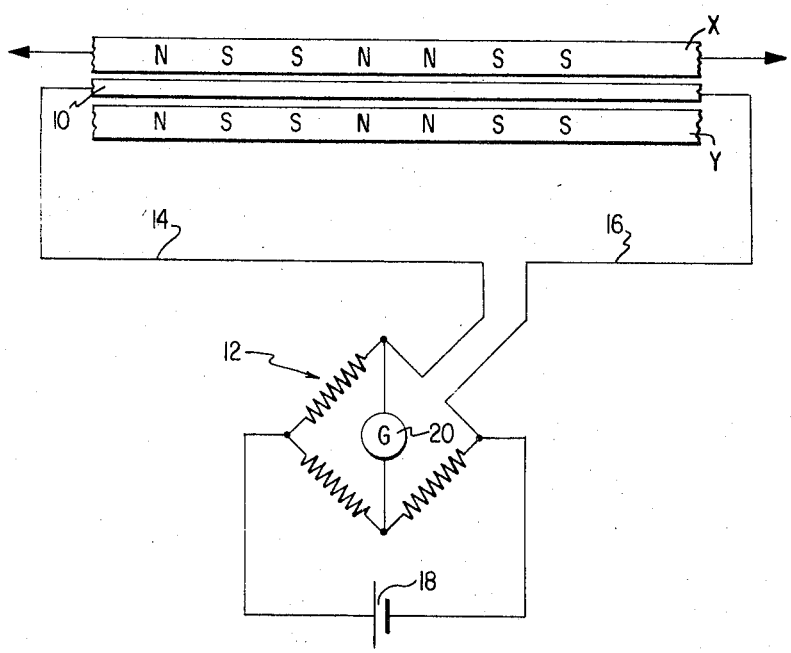
FIGURE 1 represents a circuit embodying this invention.

Referring now to FIGURE 1, a ribbon 10, e.g., of indium-antimonide is shown connected in an electrical circuit with bridge 12 by connections 14 and 16. Galvanometer 20 is connected across bridge 12 to read changes in resistance in the circuit. A power source, e.g., battery 18, completes the circuit. Ribbon 10 is placed between two magnetic tapes X and Y, which are arranged in face-to-face relationship as indicated by the N and S markings which represent the magnetic north and south poles formed along the tracks by the recording thereon. Tape X, as indicated by the arrows at either end, is attached to a means (not shown) for moving it relative to tape Y, and tape Y is stationary. Any means for supporting and moving the tapes can be used and, if desired, both tapes can be movable.

Figure 2:
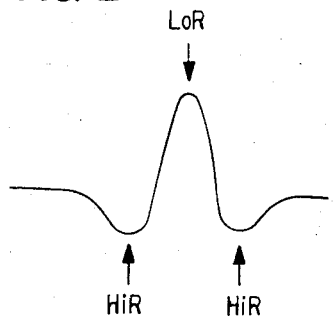
FIGURE 2 is a curve, plotting resistance of the metal ribbon, against tape movement.

In operation, the indium-antimonide ribbon 10 is placed between tapes X and Y arrayed with their tracks face-to-face as shown, and the two tapes are moved relative to each other by movement of tape X. At the position of maximum correlation of the recordings on tapes X and Y little if any flux will transgress ribbon 10 because of similar signs on the poles of the recordings opposite each other, and the resistance of this ribbon will be a minimum. Galvanometer 20 placed in bridge 12 measures this resistance. Maximum resistance will result when tape X is moved either way from the position of maximum correlation. FIGURE 2 illustrates graphically relative resistance of ribbon 10 as measured by galvanometer 20 on the vertical axis against movement of tape X on the horizontal axis. The resultant curve is known as a correlation "signature" and illustrates the low resistance point when tapes X and Y are in their best correlation position and the high resistance points which will be observed when one tape is moved in either direction from the position of correlation.

With the magnetic events having been placed in correlation as described above, it remains, however, in the new correlation process, particularly when it is being used with seismic recordings, to tie the two magnetic tapes, i.e., seismic signal trains, together in time. Magnetic tapes X and Y will have time-break pulses associated with the beginning of their respective signal trains. One method of tying the two seismograms together is to rotate tape X to a face-up position running parallel beside tape Y and, without relative motion which would lose the identity of the position of correlation as determined above, mark the relative positions of the tapes. Marking can be accomplished by two magnetic pick-up heads (not shown), whose relative positions are known, placed on the time-break tracks of tapes X and Y and mechanically oscillated forward and backward along the time-break tracks as required to register an output from the heads. When one time-break is found on tape Y, e.g., by displaying the outputs from these heads on an oscilloscope, then a micrometer type adjustment is made for the head on tape X until these two pulses are coincident in time. This micrometer adjusted separation of the time breaks is translated to the time separation of these two signal trains and hence provides the necessary correction in time to achieve maximum correlation between the signal trains on tapes X and Y. "Fluxheads" can be used in place of the conventional heads described above, if desired, and the time breaks can be located by micrometer adjusting only, since it is not necessary to oscillate "fluxheads" to locate the time breaks.

It is understood that any one of several metallic substances might be used as a flux sensitive element in this invention. It is also understood that recordings such as X and Y may be impressed on other than the usual magnetic tape in order to raise the level of the magnetic flux along the signal track.

It is claimed:

1. A method for determining correlation between the signal trains recorded on two magnetic tapes comprising arranging the two tapes in closely spaced face-to-face relationship on opposite sides of a resistive ribbon of a material which exhibits a change in resistance when transgressed by magnetic flux, moving at least one of said tapes relative to the other, and measuring the change of resistance in said ribbon as said one recording is moved, the point of maximum correlation between said signal trains being the point at which the lowest resistance is measured.

2. The method of claim 1 wherein said material is indium-antimonide.

3. The method of claim 1 wherein said material is indium-arsenide.

4. The method of claim 1 wherein said material is bismuth.

5. The method of claim 1 wherein said two signal trains are seismic reflection signals.

References Cited

UNITED STATES PATENTS

| | | |
|---|---|---|
| 2,774,056 | 12/1956 | Stafford et al. |
| 2,906,945 | 9/1959 | Weiss _____ 324—46 X |
| 3,246,219 | 4/1966 | Devol et al. _____ 340—146.2 X |

RUDOLPH V. ROLINEC, *Primary Examiner.*

A. E. SMITH, *Assistant Examiner.*

U.S. Cl. X.R.

340—146.2